United States Patent
Kim et al.

(10) Patent No.: US 9,977,170 B2
(45) Date of Patent: May 22, 2018

(54) LIGHT CYLINDER AND LIGHT DEVICE USING THE SAME

(71) Applicant: Heon Cheol Kim, Goyang, Gyeonggi-do (KR)

(72) Inventors: Heon Cheol Kim, Gyeonggi-Do (KR); Jang Hwan Hwang, Gyeonggi-Do (KR)

(73) Assignee: Heon Cheol Kim, Goyang, Gyeonggi-do (KR)

( * ) Notice: Subject to any disclaimer, the term of this patent is extended or adjusted under 35 U.S.C. 154(b) by 163 days.

(21) Appl. No.: 14/713,026

(22) Filed: May 15, 2015

(65) Prior Publication Data

US 2016/0282534 A1 Sep. 29, 2016

(30) Foreign Application Priority Data

Mar. 25, 2015 (KR) .......... 10-2015-0041337
Mar. 25, 2015 (KR) .......... 10-2015-0041339
Mar. 25, 2015 (KR) .......... 10-2015-0041340

(51) Int. Cl.
*G02B 6/26* (2006.01)
*F21V 8/00* (2006.01)
*G02B 1/04* (2006.01)
*G02B 3/08* (2006.01)

(52) U.S. Cl.
CPC ............ *G02B 6/001* (2013.01); *G02B 1/041* (2013.01); *G02B 1/048* (2013.01); *G02B 6/0006* (2013.01); *G02B 3/08* (2013.01)

(58) Field of Classification Search
CPC ........ G02B 1/048; G02B 3/08; G02B 6/0006; G02B 6/001; F21V 3/00; F21V 5/007; F21V 5/045
See application file for complete search history.

(56) References Cited

U.S. PATENT DOCUMENTS

| | | | | |
|---|---|---|---|---|
| 7,164,819 B2* | 1/2007 | Jenson | ............... | G02B 6/02033 385/39 |
| 7,822,335 B1* | 10/2010 | Pastore | .................. | G03B 15/03 348/370 |
| 8,415,865 B2* | 4/2013 | Liang | .................. | G02B 6/0006 313/46 |
| 9,096,170 B2* | 8/2015 | Swessel | .................. | B60Q 3/06 |
| 9,366,796 B2* | 6/2016 | Irie | ........................ | G02B 6/001 |
| 9,395,075 B2* | 7/2016 | Simon | .................. | F21V 23/009 |
| 2013/0044497 A1* | 2/2013 | Sakamoto | ............ | G02B 6/0008 362/311.04 |
| 2013/0343079 A1* | 12/2013 | Unger | ....................... | F21K 9/61 362/555 |
| 2015/0285484 A1* | 10/2015 | Hsu | ......................... | F21V 29/70 362/607 |
| 2016/0041324 A1* | 2/2016 | Nava | ..................... | G02B 6/0001 362/311.01 |
| 2016/0258579 A1* | 9/2016 | Dulley | ..................... | F21K 9/135 |

* cited by examiner

*Primary Examiner* — Peggy Neils
(74) *Attorney, Agent, or Firm* — Mintz Levin Cohn Ferris Glovsky and Popeo, P.C.; Kongsik Kim; Derek E. Constantine

(57) ABSTRACT

A light device using a light cylinder is disclosed. The light device includes a cover, a light source section combined with at least part of an inside surface of the cover and configured to output a light, and a light cylinder configured to include one entrance part and a plurality of output parts. The entrance part is combined with the light source section, and the light incident through the entrance part is outputted through the output parts.

12 Claims, 20 Drawing Sheets

LIGHT CYLINDER AND LIGHT DEVICE USING THE SAME

CROSS-REFERENCE TO RELATED APPLICATION

This application claims priority to Korean Application No. 10-2015-0041337 filed on Mar. 25, 2015, Korean Application No. 10-2015-0041339 filed on Mar. 25, 2015, and Korean Application No. 10-2015-0041340 filed on Mar. 25, 2015. The applications are incorporated herein by reference.

TECHNICAL FIELD

The present invention relates to a light device using a light cylinder.

BACKGROUND ART

Generally, a fluorescent lamp and an incandescent lamp have widely used as a light device. The incandescent lamp has low efficiency and economic feasibility due to high power consumption, and thus demand of the incandescent lamp has recently reduced.

A light pipe, which is an element that transmits light from a light source through the inside of the light pipe, has gained much interest in recent times because of its ability to transmit light to remote locations with relatively little transmission loss and its potential for allowing small thicknesses in products.

In the related art, a light pipe includes an air layer, with a diffusion surface or a reflection surface having prism patterns, on the inside or outside of the light pipe. The light pipe outputs a light inputted through the air layer by using the diffusion surface to outside, or delivers the light by using internal reflection through the reflection surface.

Here, it would be desirable if the light that is outputted from a light source and inputted to the light pipe could be transferred to the output end (far end) of the light pipe uniformly, but due to the hot spot phenomenon that occurs at the input end of the light pipe, the light may not be transferred uniformly over the entirety of the light pipe. The hot spot phenomenon occurs at a diffusion layer formed for outputting uniformly the light, and uniformity and brightness of the light at middle or the output end of the light pipe may be lowered due to the hot spot phenomenon by the diffusion layer of an input end of the light pipe. To solve this problem, several LEDs are installed inside the light pipe to increase uniformity in a diffuser type light pipe, but power consumption and manufacture cost become higher because the number of the used LEDs increases and it is difficult to realize the light device with thin size.

SUMMARY

An aspect of the invention is to provide a light device using a light cylinder filled with an UV-curable resin.

Another aspect of the invention is to provide a light device using a light cylinder for reducing consumption of a power because the number of used LEDs is minimized.

Still another aspect of the invention is to provide a light device using a light cylinder with high uniformity of a light, over the entirety of the light cylinder, and high light diffusion efficiency.

In a first embodiment of the invention, a light device comprises a cover; a light source section combined with one or more inside sides of the cover and configured to output a light; and a light cylinder configured to include one entrance part and plural output parts. Here, the entrance part is combined with the light source section, and the light incident through the entrance part is outputted through the output parts.

In a second embodiment of the invention, a light device comprises a cover; a light source section fixed to one or more inside sides of the cover, and configured to include a light source array; and light cylinders configured to include an entrance part and an output part, wherein a light incident through the entrance part is outputted through the output part. Here, the light cylinders are respectively connected to light sources of the light source array.

In a third embodiment of the invention, a light device comprises a bulb; a main body of which the bulb is combined with one of an upper side and a lower side; a light source section combined with an inside side of the main body and configured to output a light; and light cylinders configured to include an entrance part for incidence of a light and an output part for outputting the light. Here, the entrance parts of the light cylinders are combined with the light source section, and the light incident through the entrance parts is outputted through the output parts.

In a fourth embodiment of the invention, a light device comprises a bulb; a main body of which the bulb is combined with one of an upper side and a lower side; a light source section combined with an inside side of the main body and configured to output a light; and a light cylinder configured to include one entrance part and plural output parts. Here, the entrance part is connected to the light source section, and the light incident through the entrance part is outputted through the output parts.

In a fifth embodiment of the invention, a light device comprises a cover; a light source section combined with one or more sides of both inside sides of the cover and configured to output a light; and a light cylinder configured to include an entrance part for incidence of a light and an output part for outputting the light. Here, the output part is formed at one or more sides of sides of the light cylinder.

In a sixth embodiment of the invention, a light device comprises a bulb; a main body of which the bulb is combined with one of an upper side and a lower side; a light source section combined with an inside side of the main body and configured to output a light; and light cylinders configured to include an entrance part for incidence of a light and an output part for outputting the light. Here, the output part is formed on at least one of sides of the light cylinder.

In a seventh embodiment of the invention, a light cylinder comprises an outer layer; and an inside layer formed by filling optical resin in the outer layer. Here, at least one hole for outputting a light is formed as an output part on one or more sides of both sides of the outer layer.

A light device of the invention uses a light cylinder, thereby increasing uniformity of a light over the entirety of the light device and transmission efficiency of the light.

The light cylinder includes a core formed by filling an UV-curable resin and may delivers a light incident through a light source section to an output part by using a total reflection. Here, the resin is determined considering a refractive index of a clay in the light cylinder so that the total reflection is realized between the core and the clay, and may be a single material or mixed material.

The light device may minimize the number of used LEDs, thereby reducing the consumption of a power.

Additional aspects and advantages of the present invention will be set forth in part in the description which follows,

DETAILED DESCRIPTION

Figure 1:
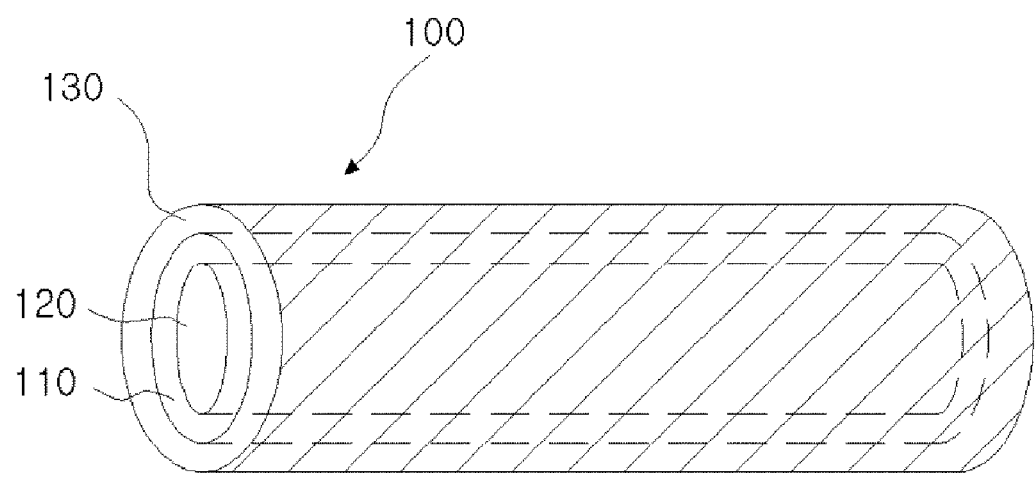
FIG. 1 is a perspective view illustrating a light cylinder according to a first embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or configurations, but do not preclude the presence or addition of one or more other features, integers, steps, operations, elements, configurations, and/or groups thereof.

The invention relates to a light device using a light cylinder filled with an UV-curable resin. The light cylinder may be manufactured by filling a light-transmittable resin in a clay for transmitting a light such as a tube, etc. and then curing the light-transmittable resin using ultraviolet rays.

In one embodiment, total reflection may occur between the clay and a core formed by curing the filled optical resin. As a result, a light inputted into the light cylinder may be transmitted to an output part of the light cylinder.

In another embodiment, the optical resin in the core may be generated by mixing light-transmittable materials. It is desirable that the optical resin having desired refractive index may be generated by mixing the materials, wherein the total reflection is realized between the clay and the core according to the desired refractive index. However, component of the optical resin may be variously changed as long as the total reflection is realized between the clay and the core, and it is to be appreciated that this changes that do not depart from the spirit and technical scope of the invention are encompassed in the invention Certain embodiments of the present invention will be described below in more detail with reference to the accompanying drawings.

For understanding and convenience of description, the light cylinder and a method of manufacturing the light cylinder will be described with reference to FIG. 1 to FIG. 4, and then a light device using the light cylinder will be described with reference to FIG. 5.

Figure 2:
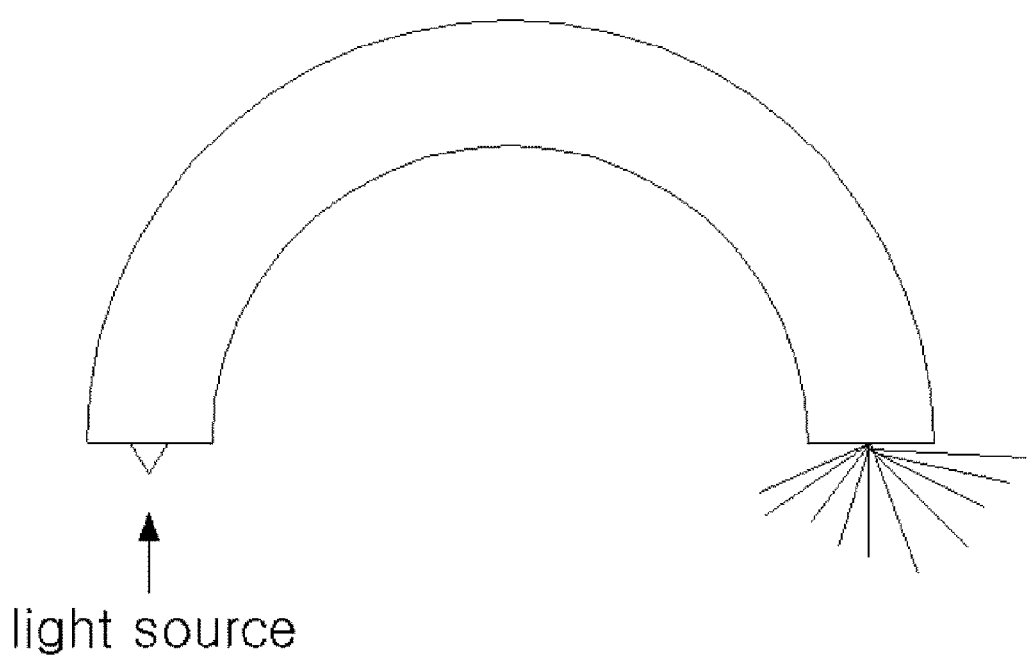
FIG. 2 is a view illustrating a light cylinder according to a second embodiment of the invention.

FIG. 1 is a perspective view illustrating a light cylinder according to a first embodiment of the invention, and FIG. 2 is a view illustrating a light cylinder according to a second embodiment of the invention.

As illustrated in FIG. 1, a light cylinder 100 according to the first embodiment includes a clay 110 (outer layer), a core 120 (inside layer) and a reflection. The shape of the light cylinder 100 is not limited to a particular form and can be any one of a variety of shapes such as circle, oval, ellipse, quadrilateral, triangle, etc. The shape of the light cylinder 100 may also be a curved shape.

The clay 110 may be the exterior sheath of the light cylinder 100 that allows light diffusion. The clay 110 may be formed from a flexible material that allows curving and bending. FIG. 2 shows a clay having a curved shape.

According to the embodiment, the clay 110 may have a cylindrical shape, such as a cylinder, a tube, etc. Of course, the clay 110 may be any one of a variety of shapes other than a cylindrical shape, such as a quadrilateral shape, a triangular shape, a planar shape, etc. The clay 110 is not limited to a particular form as long as it allows light diffusion and is made up of a bendable material.

The clay 110 may be molded from a transparent or an intransparent material.

Also, an existing product for an exterior sheath such as a pre-fabricated tube or cylinder may be employed as is for the clay 110.

In an embodiment, the thickness of the clay 110 is not limited to a particular value, but it can be advantageous to select the thickness of the clay 110 within the range of greater than or equal to 0.01 mm and smaller than or equal to 10 mm in order to decrease the thickness of the final product. More preferably, the clay 110 may be made to have a thickness that is greater than or equal to 0.01 mm and smaller than 1 mm. The thickness of the clay 110 may be determined such that the light entering the light cylinder 100 may be efficiently contained and the light cylinder 100 is able to bend.

Since the clay 110 must also serve as an exterior sheath for molding the core 120, the inside of the clay 110 may include an empty space (i.e. a hole).

The clay 110 may be molded from a resin that includes as its main component a homopolymer or a copolymer such as polycarbonate (PC), polymethyl methacrylate (PMMA), silicone, polyethylene (PE) resin, polypropylene (PP) resin, polytetrafluoroethylene, polystyrene, polyvinyl chloride, and the like.

Here, polymethyl methacrylate (PMMA), which is a polymer that includes methyl methacrylate as a component, has superb transparency and durability compared to most plastics. It has a light transmittance of 90 to 91% and is easy to apply colors.

Polycarbonate (PC) is easy to process by molding and has excellent optical properties and strength. That is, polycarbonate can transmit an average of about 89% of visible rays.

Polypropylene, which is a thermoplastic resin that softens when heat is applied, is a polymer of the propylene monomer and forms a helical structure. Because of its unique crystalline structure, it provides desirable properties such as high strength, thermal resistance, and chemical stability.

The core 120 may be formed by filling an UV-curable resin into the clay 110 and curing the filled UV-curable resin. Such a core 120 may transmit a light.

For forming the core 120 inside the clay 110, a method of manufacturing the light cylinder 100 by way of extrusion-molding the core and clay may also be considered, instead of filling the clay 110 with a UV-curable resin. However, if the light cylinder is manufactured by extrusion molding, there is a limit to the types of materials that can be used for the core, due to the inherent properties of extrusion molding. Because of such a limit on the types of materials available for the core, it may not be possible to implement a total reflection relationship between the core and the clay, and optical losses may occur.

Accordingly, in order to easily realize total reflection properties, a method of manufacturing the light cylinder 100 according to an embodiment of the invention can manufacture the light cylinder 100 by filling the clay 110 with an optical resin which is curable by UV rays and which can implement anisotropic properties. Since the UV-curable resin can be prepared by various combinations of substances to provide a desired refractive index, it is possible to fabricate an optical resin that can form total reflection according to the material used for the clay 110. According to Snell's law, the refractive index of the core 120 formed by curing the optical resin with UV rays may be higher than the refractive index of the clay 110.

For example, the refractive index of the optical resin may be designed to satisfy Equation 1 shown below.

refractive index of optical resin≥refractive index of clay+α [Equation 1]

Here, α represents a weight and satisfies the condition $0.001 \leq \alpha \leq 0.1$.

For example, in cases where the clay 110 is made from polymethyl methacrylate (PMMA), which has a refractive index of 1.492, the core 120 may be fabricated by using mixture of urethane acrylate and epoxy acrylate, etc. which are optical resins having a refractive index for total reflection according to Snell's law.

Here, the optical resin having a low viscosity as needed for the filling can be fabricated by simultaneously mixing an optical material such as urethane acrylate and epoxy acrylate, etc., with monomers of N-vinylpyrrolidone, 2-ethoxy-2-ethoxy ethyl acrylate, 1,6-hexanediol diacrylate, N-isobutoxy methyl acrylate, isooctyl acrylate, propoxylated neopentyl glycol diacrylate, butyl carbamoyloxy ethyl acrylate, epoxy methacrylate, glycidyl methacrylate, isodecyl acrylate, isooctyl acrylate, polybutadiene diacrylate, polyester acrylate, 2-ethylhexyl acrylate, hydroxy propyl acrylate, phenyl glycidyl ether, 1,4-butanediol dimethacrylate, 1,4-butanediol diacrylate, cyclohexane dimethanol diacrylate, ethoxylated bisA dimethacrylate, etc.

In particular, when the light cylinder 100 has a curved shape as in FIG. 2, the optical resin filled in the clay 110 or the refractive index of the optical resin may be determined in consideration of the substance used for the clay 110 in order that there is no optical loss near the entrance part of the light cylinder 100.

The optical resin can be made from one substance or can be a mixed substance. In the case of a mixed substance, the substances forming the optical resin can be used in various combinations such that the refractive index of the optical resin decided above may be obtained. For example, if the refractive index of the optical resin for the filling is determined to be 1.5, the optical resin can be fabricated by mixing an optical material such as urethane acrylate and epoxy acrylate, etc., with monomers of N-vinylpyrrolidone, 2-ethoxy-2-ethoxy ethyl acrylate, 1,6-hexanediol diacrylate, N-isobutoxy methyl acrylate, isooctyl acrylate, propoxylated neopentyl glycol diacrylate, butyl carbamoyloxy ethyl acrylate, epoxy methacrylate, glycidyl methacrylate, isodecyl acrylate, isooctyl acrylate, polybutadiene diacrylate, polyester acrylate, 2-ethylhexyl acrylate, hydroxy propyl acrylate, phenyl glycidyl ether, 1,4-butanediol dimethacrylate, 1,4-butanediol diacrylate, cyclohexane dimethanol diacrylate, ethoxylated bisA dimethacrylate, etc., in appropriate proportions.

Also, while the descriptions above refer to the filled resin being cured by UV rays, the filled resin is not limited to curing by UV rays as long as it can be cured after it is filled in the clay 110.

In summary, the method of manufacturing the light cylinder according to the embodiment may entail filling the clay 110 with an optical resin having a refractive index that is determined in consideration of total reflection, and then curing the optical resin by UV curing to form the core 120. As the core 120 is formed by a filling method, various combinations can be used for the optical resin, and the core 120 can be formed with a desired refractive index by suitably combining substances according to the refractive index of the clay 110. Consequently, the light entering the light cylinder 100 may be outputted at the output part with a low loss factor. Moreover, the light leakage near the entrance part of the light cylinder 100 may also be considerably reduced.

Also, whereas the conventional light pipe may require a reflective pattern for transferring a light, the light cylinder 100 based on the embodiment does not require a reflective pattern, so that the light cylinder 100 may have a simpler structure and be manufactured more easily.

While the descriptions above refer to the core 120 being composed as a single layer, it can just as well be composed of multiple layers.

The reflection layer 130 reflects a light outputted to outside of the light cylinder 100 through the core 120. In the core 120, the entered light is total reflected by about 98%, but a light leaked to outside of the core 120 may exist by about 2%. Accordingly, the light cylinder 100 may include the reflection layer 130 coated on the clay 110 to reflect the light leaked to outside of the core 120 to the core 120.

Figure 3:
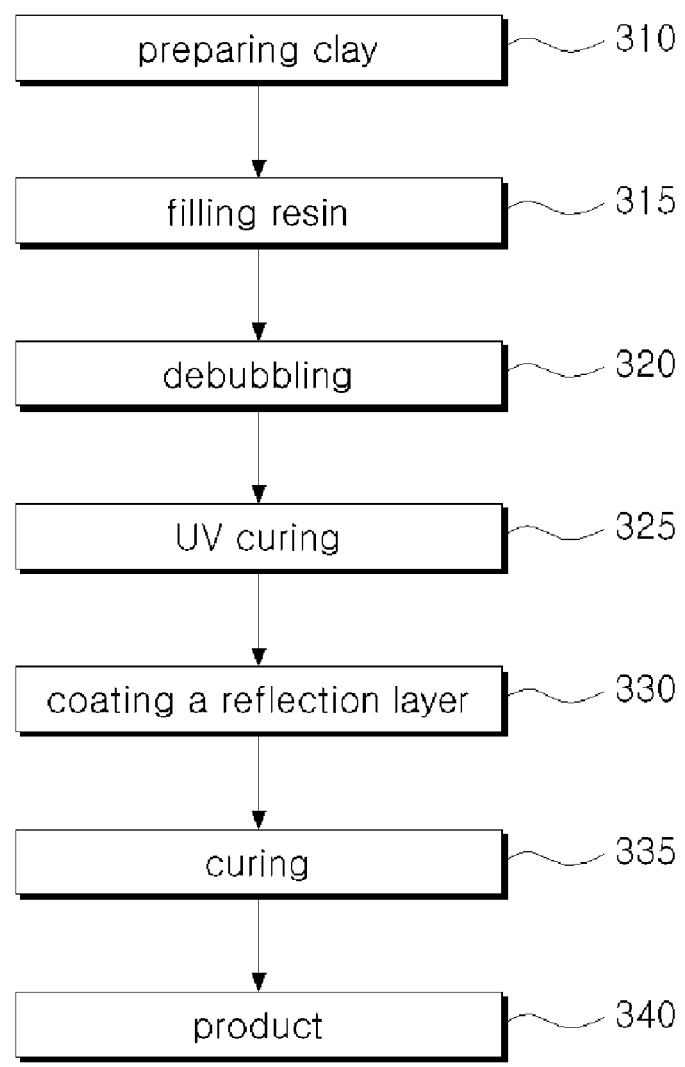
FIG. 3 is a flowchart illustrating a process of manufacturing the light cylinder according to a first embodiment of the invention.

FIG. 3 is a flowchart illustrating a process of manufacturing the light cylinder according to a first embodiment of the invention.

In a first step 310, a clay 110 is prepared that it has an internal hole, in the manner of a tube or a cylinder, for manufacturing a light cylinder 100 using a filling method. Although the description herein assumes an example in which the clay 110 is shaped as a cylinder or tube for the sake of easier explanation and easier understanding, the clay 110 may take any of a variety of shapes and may be rectangular, triangular, or curved. The first step is as illustrated in 410 of FIG. 4. In one embodiment, the clay 110 may be an existing product.

In a second step 315, an optical resin curable by the ultraviolet rays is filled in the clay 110. For example, if the clay 110 has the shape of the cylinder or the tube, the optical resin is filled in the clay 110 by injected into the clay 110.

Here, the optical resin may be filled in the clay 110 by using extra resin injection device, e.g. a dispenser.

To prevent the optical resin from flowing through the other end opposite the end where the optical resin is injected, a cap for preventing the flow of the optical resin and keeping the optical resin held within the clay 110 may be connected to the other end of the clay 110 when the clay 110 is filled with the optical resin. As already described above, the optical resin may be a UV-curable resin.

Figure 4:
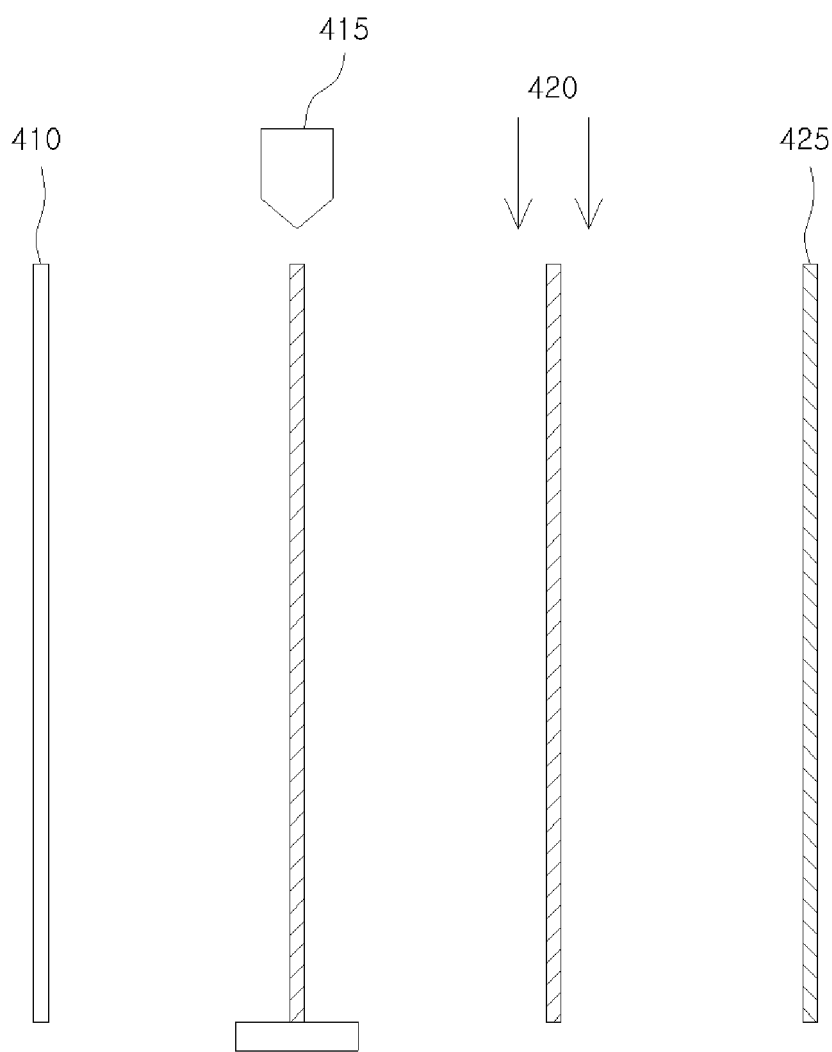
FIG. 4 is a view illustrating a process of manufacturing the light cylinder in FIG. 3.

A process of injecting the optical resin into the clay 110 is shown in 415 of FIG. 4.

In a third step 320, a debubbling process may be performed in which the bubbles created while filling the clay 110 with the optical resin are removed. If the bubbles are not removed and are left to infiltrate the inside of the clay 110, the optical properties of the light cylinder 100, such as the uniformity of the light transfer for example, may be degraded. Accordingly, a method of manufacturing the light cylinder according to the embodiment may also remove the bubbles while filling the clay 110 with the optical resin. As a result, the uniformity of the light transfer through the core 120 may be increased.

In a fourth step 325, the filled optical resin may be cured. Here, the curing may entail UV-curing.

As shown in 420 of FIG. 4, the direction of irradiating the UV rays for curing the optical resin may be the same as the direction in which the optical resin is injected into the clay 110.

In the event that an UV-curable resin is used to manufacture the light cylinder 100 as shown in FIG. 3, it is possible to mix several materials to form the optical resin, and as such, it is easy to adjust the refractive index.

An inspection process may be further performed, to inspect the light cylinder 100 manufactured by way of UV curing, which is not shown above.

In a fifth step 330, a reflection layer 130 is coated on the clay 110, to reflect the light outputted from the core 120. Here, the reflection layer 130 may be formed by coating material including at least one of silver Ag, platinum Pt, aluminum Al which are metals, as shown in 425 of FIG. 4.

In a sixth step 335, the reflection layer 130 is cured.

The reflection layer 130 may be cured by using the ultraviolet rays or an electromagnetic wave, etc.

In a seventh step 340, the light cylinder 100 that has passed the inspection process may be distributed as a product.

Figure 5A:
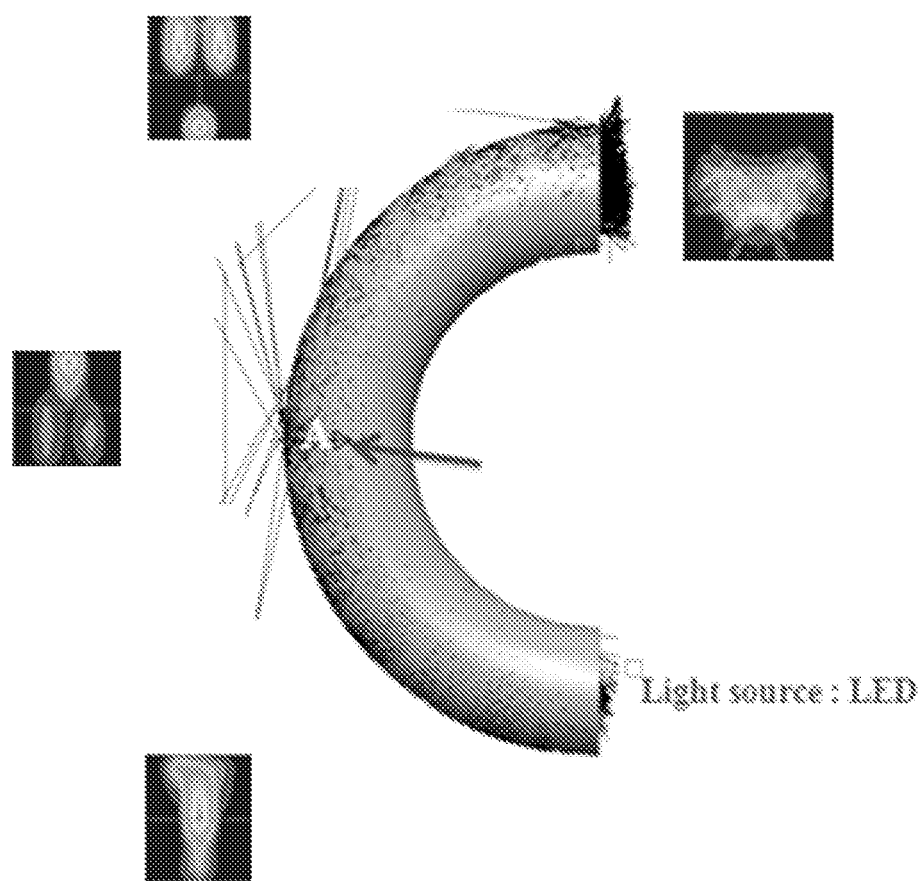
FIG. 5A and FIG. 5B show simulation results on light leakage for a light cylinder manufactured by extrusion molding according to the related art and a light cylinder according to the first embodiment of the invention.
Figure 5B:
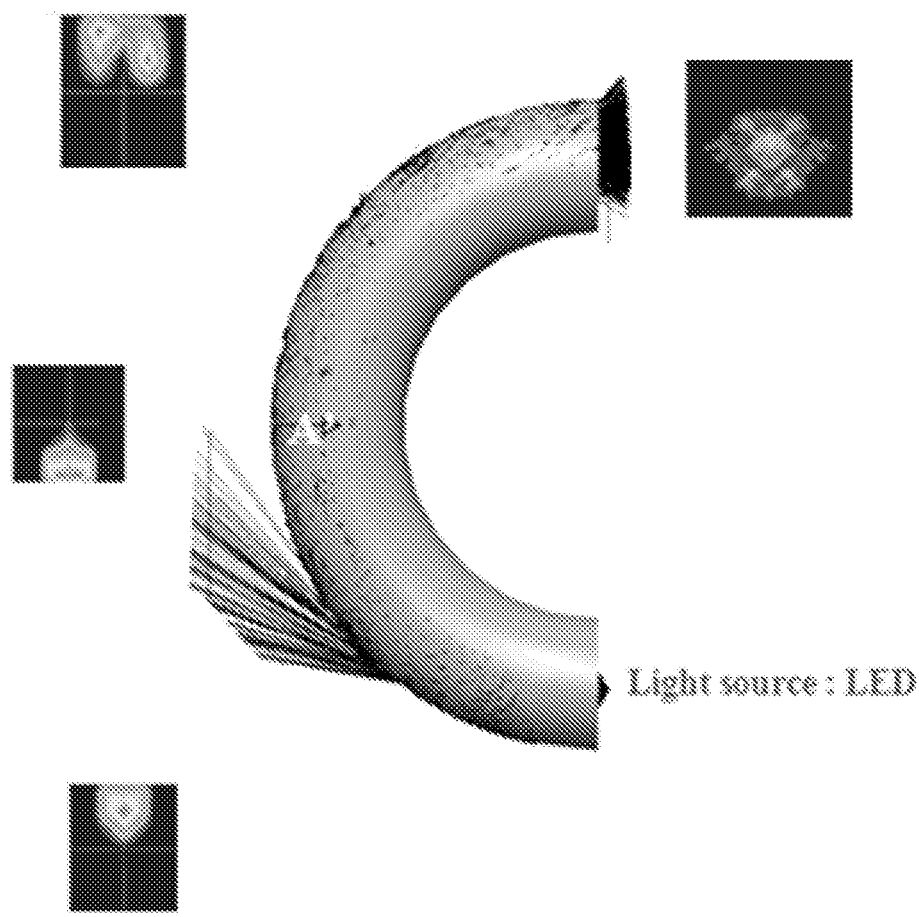

FIG. 5A and FIG. 5B show simulation results on light leakage for a light cylinder manufactured by extrusion molding according to the related art and a light cylinder according to the first embodiment of the invention.

FIG. 5A shows simulation results concerning light leakage in a light cylinder manufactured according to the first embodiment of the invention, while FIG. 5B shows simulation results concerning light leakage in the light cylinder manufactured by extrusion molding.

As shown in FIG. 5B, it can be seen that the light cylinder manufactured by extrusion molding has much leakage of light in the curved region where the light source enters.

In contrast, it can be seen that the light cylinder 100 manufactured by filling a UV-curable resin as in the first embodiment of the invention has almost no light leakage at the curved region where the light source enters.

Both the light pipe manufactured by extrusion molding and the light cylinder manufactured based on the first embodiment of the invention have small amounts of light leakage at the bended part A, but the amounts are so small that they are not perceptible to the human eye.

Comparing the light at the output part opposite the surface where light enters, the light cylinder manufactured by extrusion molding has much of the light lost due to light leakage occurring at the curved region adjacent to the point where light enters, and as such, has a relatively smaller amount of light ejected at the output end of the light cylinder.

In contrast, the light cylinder manufactured by filling the UV-curable resin according to an embodiment of the invention has the light leakage almost eliminated at the region where the light cylinder manufactured by extrusion molding suffers much light leakage (the curved region adjacent to the light entrance point), with the light ejected evenly at the output end of the light cylinder.

The light cylinder and the method of manufacturing the same is described with reference to FIG. 1 to FIG. 5.

Hereinafter, a light device using the light cylinder will be described in detail.

Figure 6:
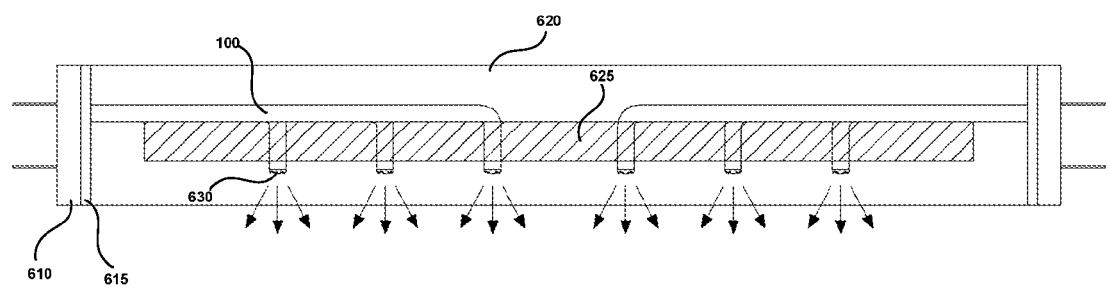
FIG. 6 is a view illustrating a light device using the light cylinder according to a first embodiment.
Figure 7:
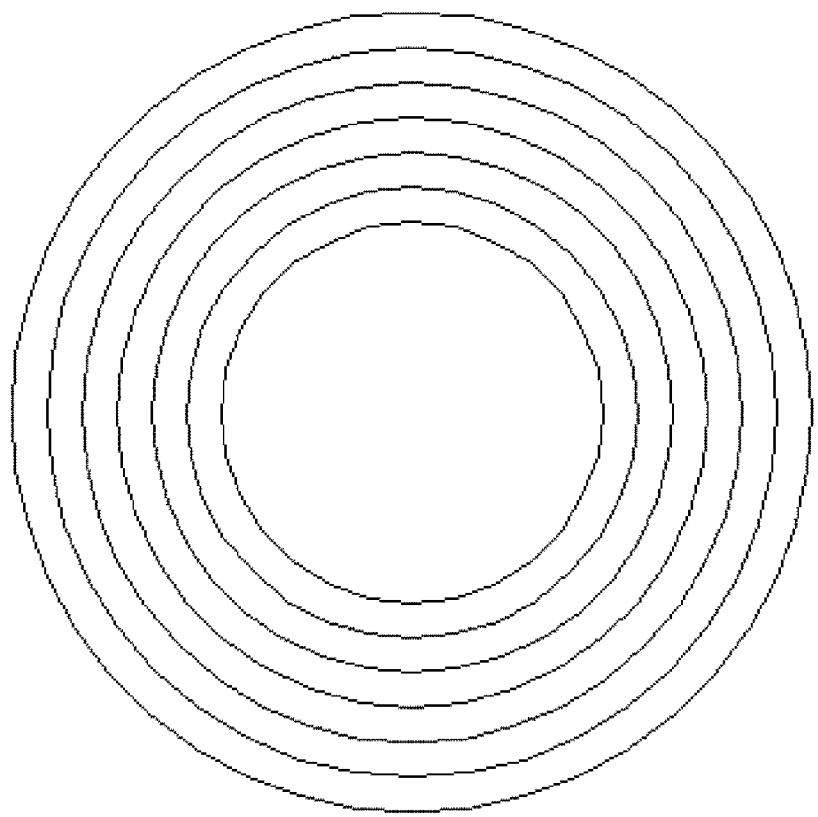
FIG. 7 is a plane view illustrating a Fresnel lens according to a first embodiment of the invention.
Figure 8:
FIG. 8 is a side view illustrating the Fresnel lens of the first embodiment.
Figure 9:
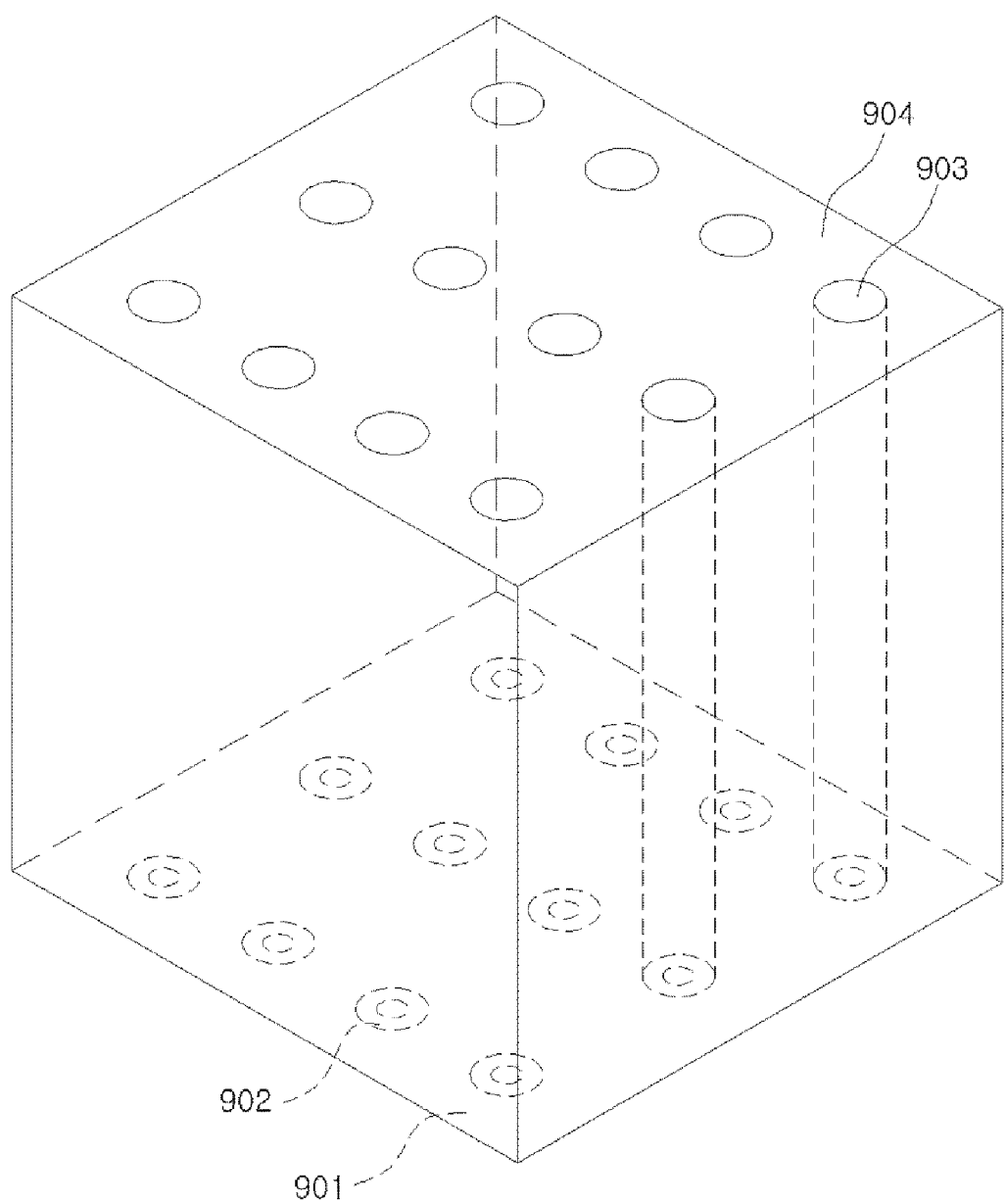
FIG. 9 is a view illustrating a process of manufacturing the Fresnel lens according to a first embodiment.
Figure 10:
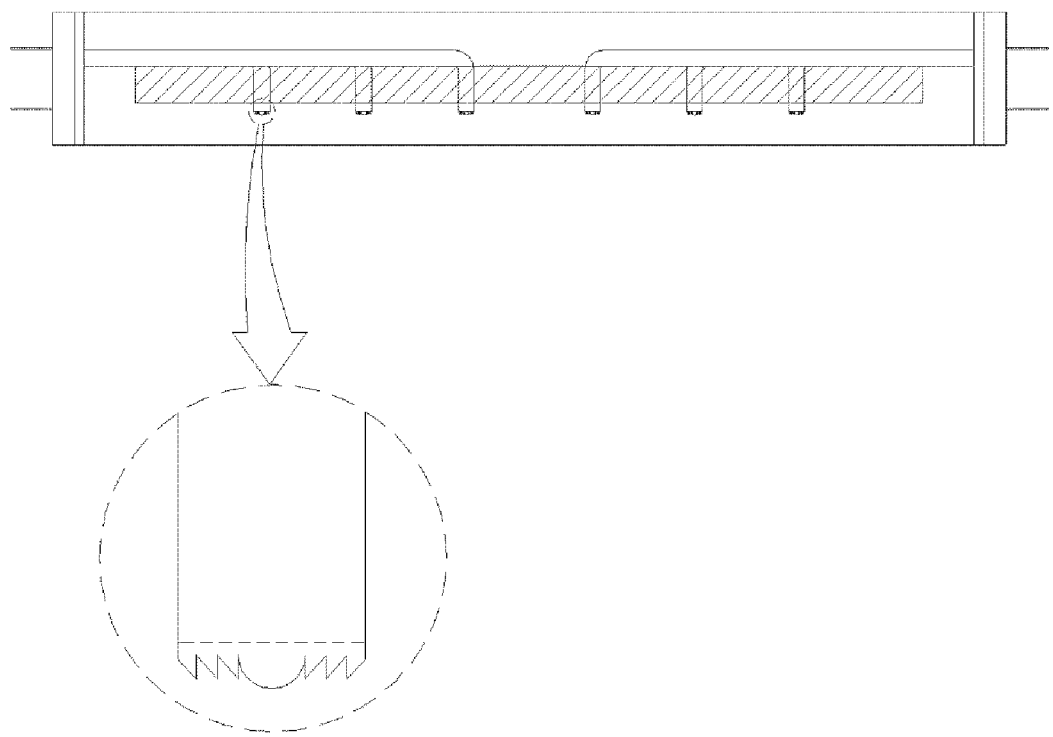
FIG. 10 is a view illustrating enlargedly the light cylinder which the Fresnel lens are formed at an output part according to the first embodiment.

FIG. 6 is a view illustrating a light device using the light cylinder according to a first embodiment, FIG. 7 is a plane view illustrating a Fresnel lens according to a first embodiment of the invention, and FIG. 8 is a side view illustrating the Fresnel lens of the first embodiment. FIG. 9 is a view illustrating a process of manufacturing the Fresnel lens according to a first embodiment, and FIG. 10 is a view illustrating enlargedly the light cylinder which the Fresnel lens are formed at an output part according to the first embodiment.

In FIG. 6, a light device 600 includes a power supply section 610, a light source section 615, a cover 620, a light cylinder 100 and a fixing member 625.

The power supply section 610 is a supplying path of a power. For example, the power supply section 610 may be a socket.

The power supply sections 610 may be respectively combined with both outer sides of the cover 620.

Accordingly, the power supply section 610 may be connected to external power module and receive the power from the external power module.

The light source section 615 is connected to both internal surfaces of the cover 620.

That is, the light source section 615 may be fixed with combined with one side of the power supply section 610 and output a light according to the power supplied from the power supply section 610.

The light source section 615 is a means for providing the light. For example, the light source section 615 may be an LED. More particularly, the light source section 615 may be a monochromatic (e.g. white, blue, etc.) LED.

The light source sections 615 are respectively connected to both inside sides of the cover 620 in the first embodiment. However, the light source section 615 may be connected to one inside side of the cover 620.

The cover 620 protects the light source section 615 and the light cylinder 100, and diffuses a light outputted from the light cylinder 100. The cover 620 may be realized as a tube having a space where the light source section 615 and the light cylinder 100 locate. Additionally, the cover 620 may be formed with transparent material or semi-transparent material, to diffuse the light outputted from the light cylinder 100.

The light cylinder 100 is manufactured by filling the UV-curable resin as mentioned above and may output uniformly the light at its output end because the optical loss does not occur.

In one embodiment, the light cylinder 100 includes one entrance part and plural output parts. The entrance part is combined with the light source section 615.

Since the light cylinder 100 is manufactured by filling the UV-curable resin as described above, optical loss of the light cylinder 100 may not occur though the light cylinder 100 has curved shape. Accordingly, the light cylinder 100 may transmit the light inputted through the entrance part to the output part, without the loss of the light, by using the total reflection.

In one embodiment, the output parts may be separately disposed with constant distance so that the light can be uniformly emitted over the entirety of the light device.

The light cylinder 100 may be made up of flexible material. Accordingly, the output part of the light cylinder 100 may be fixed through the fixing member 625 through bending.

The fixing member 625 is a means for fixing the light cylinder 100, and is fixed or not fixed to the inside side of the cover 620.

Here, the fixing member 625 may be made up of unbent material, wherein holes may be formed with constant distance on the fixing member 625.

Accordingly, the output parts of the light cylinder 100 may pass respectively through the holes of the fixing member 625 and thus the light cylinder 100 may be fixed by the fixing member 625.

Here, widths of the holes of the fixing members 625 may be the same length as a diameter of the light cylinder 100.

In one embodiment, Fresnel lens 630 may be formed on one terminal, e.g. end of the output part of the light cylinder 100, to enhance diffusion efficiency of the light.

FIG. 7 is a plane view illustrating the Fresnel lens, and FIG. 8 is a side view illustrating the Fresnel lens. As shown in FIG. 7 and FIG. 8, surface of the Fresnel lens 630 is not uniform, and may have a structure formed by etching the surface with constant angle, to increase diffusion efficiency of the light.

For example, the Fresnel lens 630 may be manufactured by injecting a resin on a substrate on which a mold is formed. Here, refractive index of the resin for manufacturing the Fresnel lens 630 may be the same as that of the resin in the light cylinder 100.

The Fresnel lens 630 is manufactured and then the manufactured Fresnel lens 630 may adhere to one side of the output part of the light cylinder 100. The Fresnel lens 630 may be formed by filling the UV-curable resin, which is the same material as resin in the light cylinder 100, when the light cylinder 100 is manufactured.

FIG. 9 is a view illustrating a process of manufacturing the light cylinder of which the Fresnel lens is formed at the output part.

As shown in FIG. 9, a mold 902 having a shape of the Fresnel lens is disposed on a substrate 901. A frame 904, on which holes 903 used for manufacturing the light cylinder 100 are formed, is formed over the substrate 901. Here, position of the hole 903 formed on the frame 904 may be matched with that of the mold 902 formed on the substrate 901, and a path may be formed between the hole 903 and the mold 902.

Accordingly, the light cylinder 100, of which the Fresnel lens is formed at the end, may be manufactured according as resin is injected into the hole 903 of the frame 904. Here, the resin may be the UV-curable resin as mentioned above.

In another embodiment, the resin for manufacturing the Fresnel lens may be injected into the mold 902, the injected resin may be cured, and then the UV-curable resin may be injected into the hole 903 of the frame 904, to form the Fresnel lens at the end of the light cylinder 100.

The mold 902 formed on the substrate 901 may have an etched structure with constant angle as shown in FIG. 7 and FIG. 8.

Since the structure and function of the Fresnel lens 630 are well known, any further description concerning the Fresnel lens 630 will be omitted.

FIG. 10 shows enlargedly a part of the output part of the light cylinder 100. The light diffusion efficiency of the light device may be enhanced by the Fresnel lens 630, on which grooves are formed with different angle, formed at the end of the output part of the light cylinder 100.

In one embodiment, the light incident to the light cylinder 100 through one light source section 615 may be outputted through plural output parts of the light cylinder 100. To perform this function, one entrance part of the light cylinder 100, through which the light is incident from the light source section 615, may be combined with the light source section 615 as described above, and the output parts for outputting the incident light may be formed with curved shape at the light cylinder 100.

Figure 11:
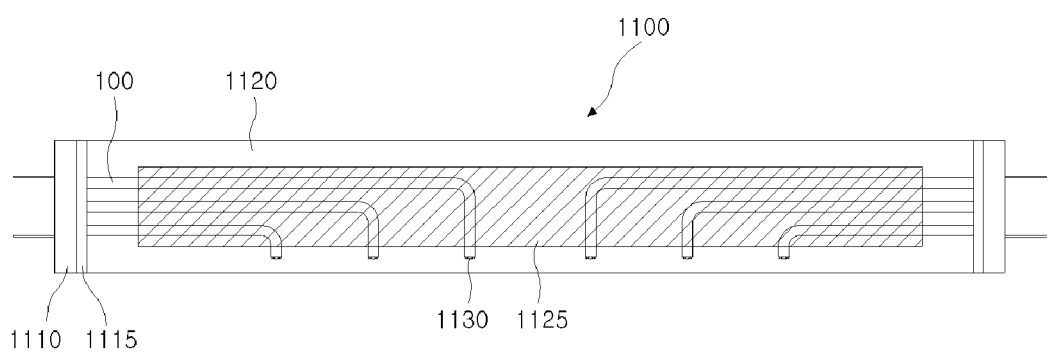
FIG. 11 is a perspective view illustrating a light device using a light cylinder according to a second embodiment of the invention.

FIG. 11 is a perspective view illustrating a light device using a light cylinder according to a second embodiment of the invention.

In FIG. 11, the light device 1100 includes a power supply section 1110, a light source section 1115, a cover 1120, light cylinders 100 and a fixing member 1125.

Basic structure of the light device 1100 in FIG. 11 is similar to that in FIG. 6, and thus only different structure will be described.

It is different from the light device of the first embodiment in that the light devices 1100 are respectively combined with one light source section 1115.

That is, whereas the light cylinder 100 according to the first embodiment has one entrance part and plural output parts, the light cylinder 100 in FIG. 11 has one entrance part and one output part.

As a result, each of the light cylinders 100 is combined with the one light source section 1115. In other words, each of the light cylinders 100 may be combined with one LED.

It is different from the light device according to the first embodiment in that the light device 1100 includes plural light source sections 1115, e.g. LEDs and each of the light cylinders 100 is combined with the LED.

The output parts of the light cylinders 100 may be separately disposed with constant distance as described above. Additionally, the fixing member 1125 may be formed to fix the light cylinders 100. The fixing member 1125 may be combined with one side of the output part.

It is similar to the light device according to the first embodiment in that a Fresnel lens 1130 is formed at the output part of each of the light cylinders 100, to increase light concentration efficiency and light diffusion efficiency.

In one embodiment, lengths of the light cylinders 100 may be different.

The lengths of the light cylinders 100 may be different according to location of the output parts of the light cylinders 100.

Figure 12:
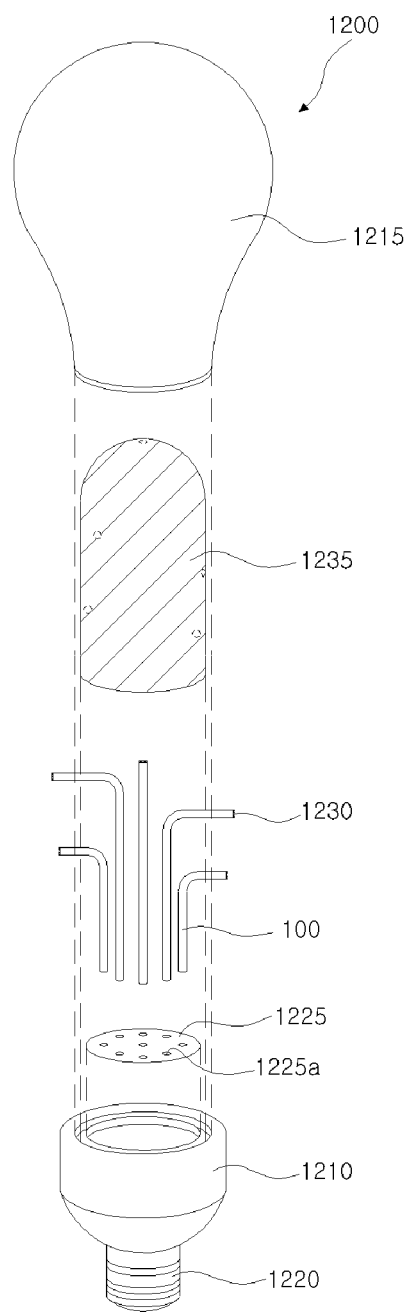
FIG. 12 is a perspective view illustrating disassembly a light device using the light cylinder according to a third embodiment of the invention.
Figure 13:
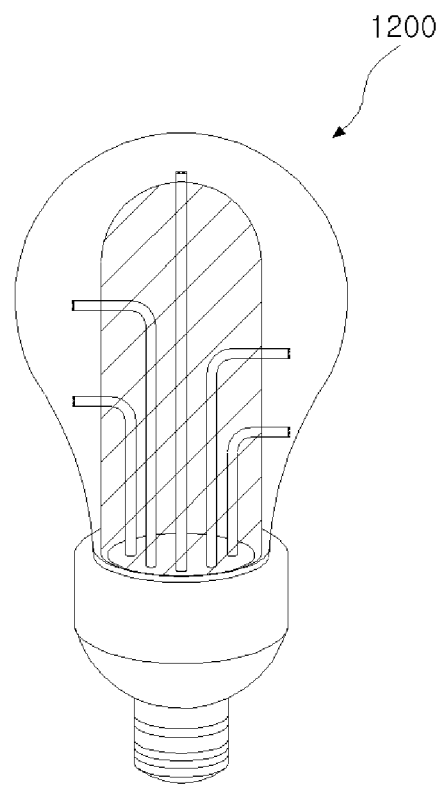
FIG. 13 is a perspective view illustrating assembled light device of the third embodiment.
Figure 14:
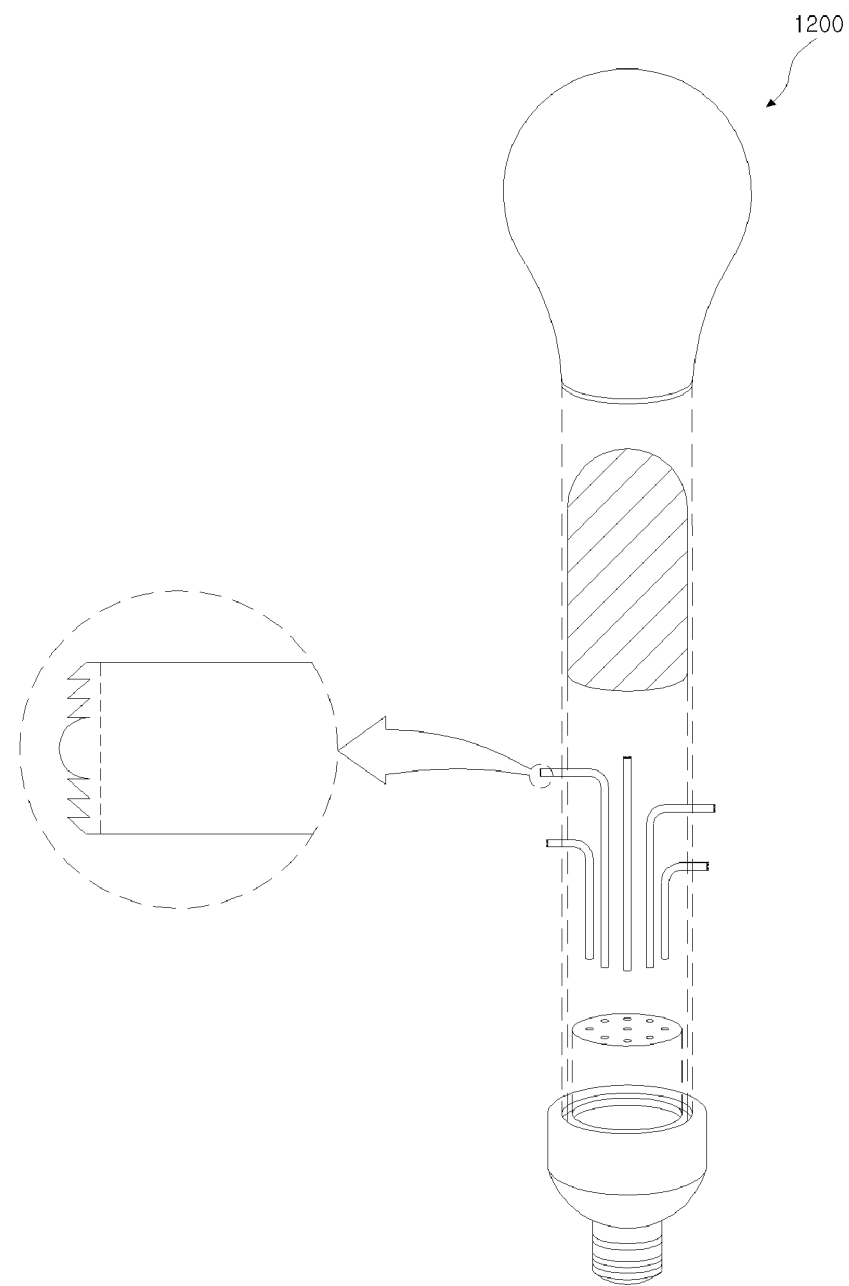
FIG. 14 is a view illustrating enlargedly an end of an output part of the light cylinder in the third embodiment.

FIG. 12 is a perspective view illustrating disassembly a light device using the light cylinder according to a third embodiment of the invention, FIG. 13 is a perspective view illustrating assembled light device of the third embodiment, and FIG. 14 is a view illustrating enlargedly an end of an output part of the light cylinder in the third embodiment.

In the light device 1200 in FIG. 12, a power supply section 1220 is combined with one of an upper side and a lower side of a main body 1210, and a bulb 1215 is combined with the other of the upper side and the lower side of the main body 1210.

The bulb 1215 performs exterior sheath function and increases diffusion efficiency of the light outputted through the light cylinder 100 in the main body 1210. This bulb 1215 may be made up of transparent material or semi-transparent material. Moreover, the bulb 1215 may be made up of material capable of realizing haze effect.

A light source section 1225 combined with the power supply section 1220 is fixed to an inside surface of the main body 1210.

The power supply section 1220 may be a socket. Accordingly, the light source section 1225 may combine with the socket in the main body 1210 and output a light according to a power supplied through the socket.

The light source section 1225 as means for providing the light may be an LED array 1225*a*.

The light cylinders 100 are respectively combined with LEDs in the light source section 1225.

The light cylinder 100 is formed by filling the UV-curable resin and may output uniformly the light through its output part without loss of the light, as described in FIG. 1 to FIG. 5.

Since the manufacturing process and the structure of the light cylinder 100 are described with reference to FIG. 1 to FIG. 5, the same description will be omitted.

A Fresnel lens 1230 is formed at the output part of the light cylinder 100. More particularly, the Fresnel lens 1230 may be formed at an end of the output part of the light cylinder 100.

The Fresnel lens 1230 may be manufactured and then the manufactured Fresnel lens 1230 may adhere to the end of the output part of the light cylinder 100. In another embodiment, the Fresnel lens 1230 may be formed at the end of the output part when the light cylinder 100 is manufactured.

Referring now to FIG. 7 and FIG. 8, grooves disposed with different angle are formed at the Fresnel lens 1230. As a result, the Fresnel lens 1230 may increase diffusion efficiency of the light emitted through the output part of the light cylinder 100.

The resin of the Fresnel lens 1230 may have the same refractive index as that of the light cylinder 100. That is, the resin of the Fresnel lens 1230 may be different from that of the light cylinder 100 as long as the resins have the same refractive index.

FIG. 14 shows enlargedly the Fresnel lens 630 formed at the end of the output part of the light cylinder 100. The output parts of the light cylinder 100 may pass through holes formed on a fixing member 1235 fixed to an inside surface of the main body 1210, with bended.

FIG. 13 shows one example of the output part of the light cylinder 100 through the hole on the fixing member 1235 with bended.

The fixing member 1235 may be fixed to the inside surface of the main body 1210, around the light source section 1225.

The fixing member 1235 may have inside empty space, and holes may be separately disposed with constant distance on its outer surface.

The holes are disposed with constant distance on the fixing member 1235 in the third embodiment, but disposition of the holes may alter according as properties of the light device 1200.

The number of the holes on the fixing member 1235 is substantially identical to that of the light cylinders 100 in the third embodiment, but the number of the holes on the fixing member 1235 may be higher than that of the light cylinders 100.

As shown in FIG. 12 and FIG. 13, the lengths of the light cylinders 100 passing through the holes of the fixing member 1235 may differ. The lengths of the light cylinders 100 may differ according to corresponding location of the bulb 1215.

In the third embodiment, the light cylinder 100 may include one entrance part and one output part, and the entrance parts of the light cylinders 100 may be respectively combined with LEDs in the LED array 625*a*.

Figure 15:
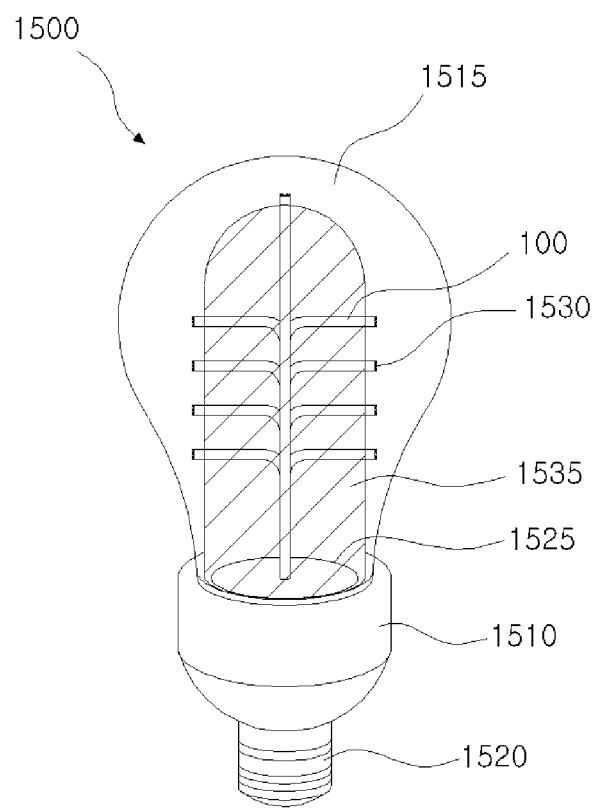
FIG. 15 is a perspective view illustrating a light device using a light cylinder according to a fourth embodiment of the invention.

FIG. 15 is a perspective view illustrating a light device using a light cylinder according to a fourth embodiment of the invention.

Basic structure of a light device 1500 in FIG. 15 is similar to that in FIG. 12. Accordingly, only different structure will be described.

In the light device 1500 of FIG. 15, one light cylinder 100 is combined with a light source section 1525. Here, the light cylinder 100 includes one entrance part and plural output parts, unlike the light cylinder 100 in FIG. 12.

Each of the output parts of the light cylinder 100 may be fixed through corresponding hole formed on a fixing member 1535, with bended.

Furthermore, lengths of the output parts may differ depending on location of the output parts disposed in the light device 1500.

Referring to FIG. 15, one end of the fixing member 1535 is fixed to an inside surface of a main body 1510, and the fixing member 1535 has inside empty space. The other end of the fixing member 1535 may be closed, and may have various shapes such as rectangular shape, circle shape, elliptical shape, etc.

The output parts of the light cylinder 100 passing through the fixing member 1535 may be separated with constant distance, based on location of a bulb 1515. Accordingly, lengths of the output parts may differ depending on corresponding location of the bulb 1515.

Briefly, the light cylinder 1530 of the fourth embodiment may have plural output parts which share one entrance part.

Figure 16:
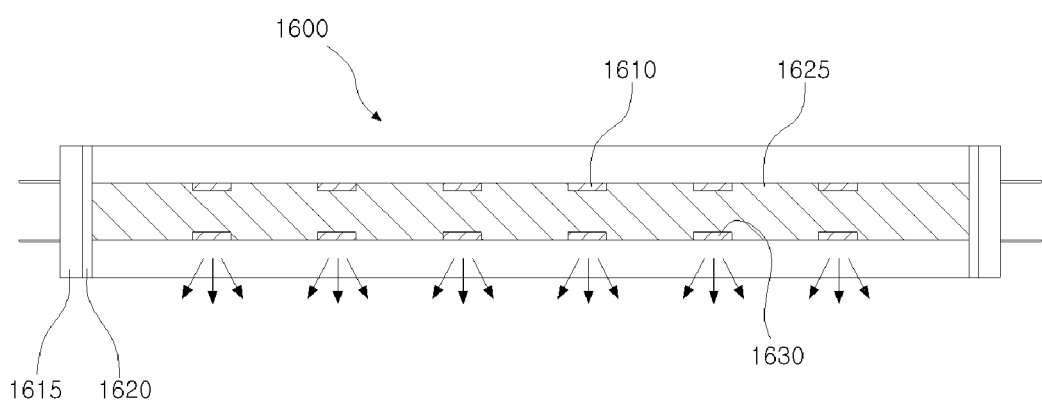
FIG. 16 is a view illustrating a light device using a light cylinder according to a fifth embodiment of the invention.
Figure 17:
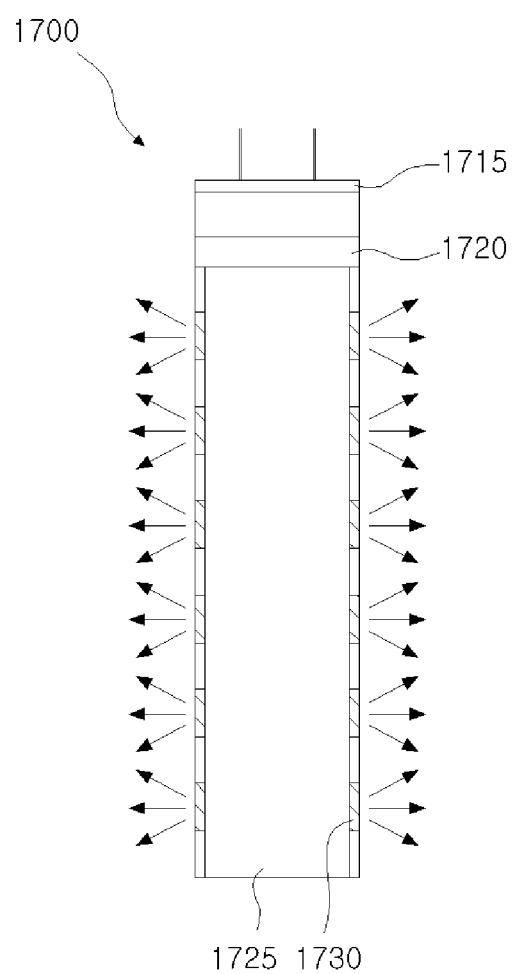
FIG. 17 is a view illustrating a light device using a light cylinder according to a sixth embodiment of the invention.
Figure 18:
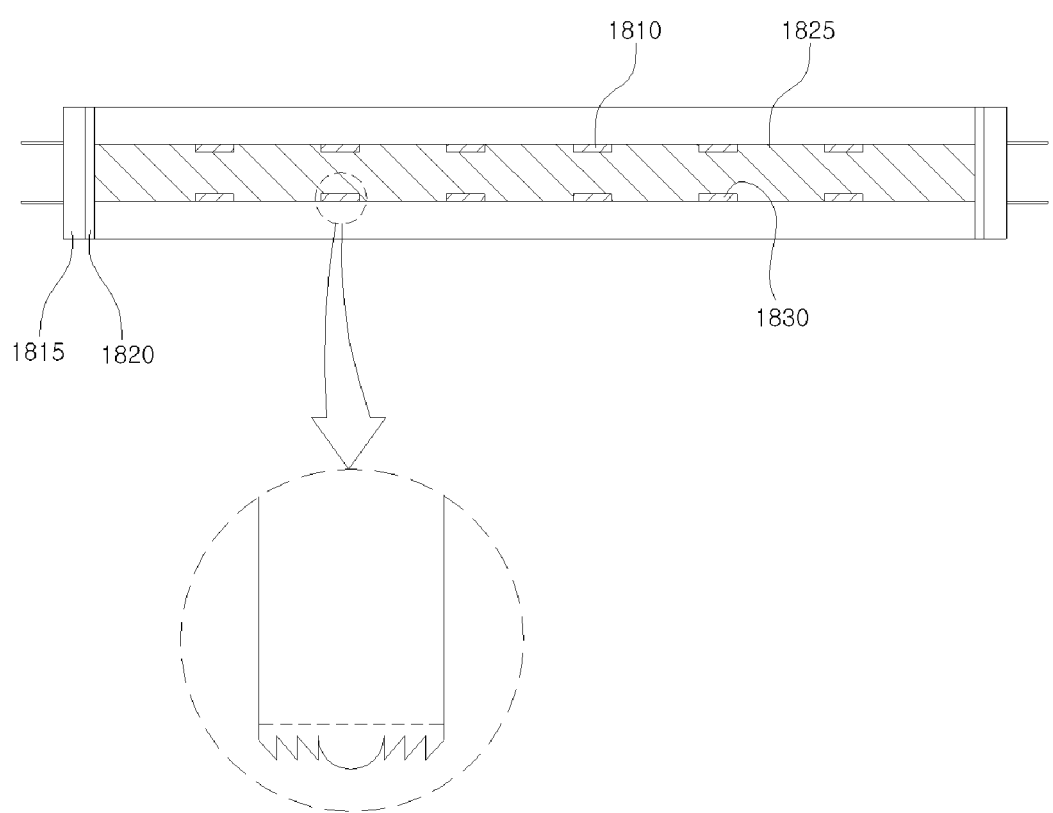
FIG. 18 is a view illustrating enlargedly an end of an output part of the light cylinder according to the fifth embodiment.
Figure 19:
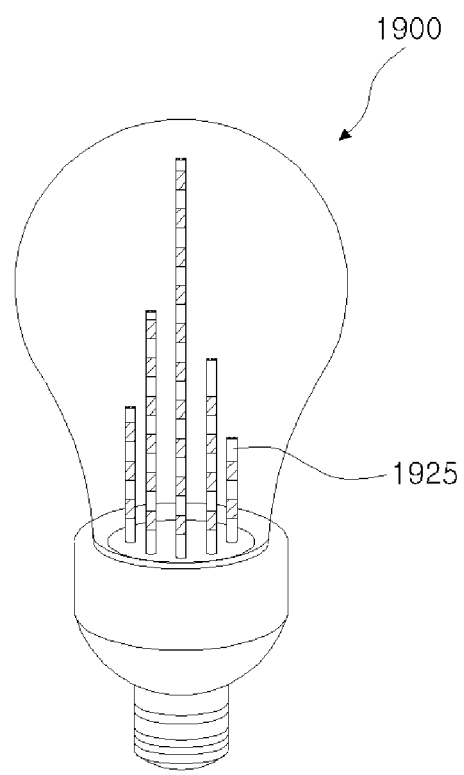
FIG. 19 is a perspective view illustrating a light device using a light cylinder according to a seventh embodiment of the invention.

FIG. 16 is a view illustrating a light device using a light cylinder according to a fifth embodiment of the invention, and FIG. 17 is a view illustrating a light device using a light cylinder according to a sixth embodiment of the invention. FIG. 18 is a view illustrating enlargedly an end of an output part of the light cylinder according to the fifth embodiment, and FIG. 19 is a perspective view illustrating a light device using a light cylinder according to a seventh embodiment of the invention.

In FIG. 16, the light device 1600 includes a cover 1610, a power supply section 1615, a light source section 1620 and a light cylinder 1625.

The cover 1610 performs exterior sheath function of the light source section 1620 and the light cylinder 1625 and increases diffusion efficiency of a light outputted through the light cylinder 1625.

This cover 1610 may be made up of transparent material or semi-transparent material. Moreover, the cover 1610 may be made up of material capable of realizing haze effect.

The power supply section 1615 is a means for supplying of a power. For example, the power supply section 1615 may be a socket. Accordingly, the light source section 1225 may combine with the socket and output a light according to the power supplied through the socket.

Additionally, the power supply section 1615 may be combined with at least one of the both ends of the cover 1610.

Accordingly, the power supply section 1610 may be connected to external power module as shown in FIG. 16 and receive the power from the external power module.

The light source section 1620 is combined with one or more of both inside sides of the cover 1610.

The light source section 1620 as means for providing the light may be one LED or an LED array.

A light outputted from the light source section 1620 may be incident through an entrance part of the light cylinder 1625 and be outputted through an output part 1630 of the light cylinder 1625. Here, the entrance part may correspond to a part of the light cylinder 1625 combined with the light source section 1620.

The light cylinder 1625 is formed by filling the UV-curable resin and may output uniformly the light through its output part 1630 without loss of the light, as described in FIG. 1 to FIG. 5.

Since the manufacturing process and the structure of the light cylinder 1625 are described with reference to FIG. 1 to FIG. 5, the same description will be omitted.

The light cylinder 1625 includes one entrance part and one or more output part 1630.

The entrance part of the light cylinder 1625 is combined with the light source section 1620 as shown in FIG. 16.

In the fifth embodiment, the output part 1630 of the light cylinder 1625 may be formed on one or more of both sides of the light cylinder 1625. Moreover, plural output parts 1630 may be formed.

In one embodiment, the entrance part may correspond to one end of the light cylinder 1625 and the other end of the light cylinder 1625 may be closed.

Accordingly, a hole may be formed with constant size as the output part, on one or more sides of both sides of the light cylinder 1625 as shown in FIG. 16.

Here, a Fresnel lens may be formed at the hole, which is not shown.

As shown in FIG. 16, the output parts 1630 may be separately disposed with constant distance when the output parts 1630 are formed on one or more sides of both sides of the light cylinder 1625.

More particularly, the light cylinder 1625 may be formed by filling the UV-curable resin in the clay 110 inside which an empty space is formed, as described above.

The output part 1630 for outputting a light may be formed by generating an open parts, such as the holes 1630, with constant distance on the clay 110 after manufacturing the light cylinder 1625.

In another embodiment, the entrance part may be formed at one end of the light cylinder 1625 and the output part 1630 may be formed at the other end of the light cylinder 1625.

At least one output part 1630 may be also formed on one or more sides of both sides of the light cylinder 1625, as shown in FIG. 16.

The Fresnel lens may be formed at the output part 1630 of the light cylinder 1625.

More particularly, the Fresnel lens may be formed at an end of the output part 1630 of the light cylinder 1625.

The Fresnel lens may be manufactured and then adhere to the end of the output part 1630 of the light cylinder 1625. In another embodiment, the Fresnel lens may be formed at the end of the output part 1630 when the light cylinder 1625 is manufactured.

Referring now to FIG. 7 and FIG. 8, the grooves are formed with different angle at the Fresnel lens. As a result, the Fresnel lens 1635 may enhance the diffusion efficiency of the light emitted through the output part of the light cylinder 1625.

As described above, the resin for the light cylinder 1625 may have the same refractive index as that for the Fresnel lens. That is, the resin for the Fresnel lens may be different from that of the light cylinder 1625 as long as the resins have the same refractive index. FIG. 18 shows enlargedly the Fresnel lens formed at the end of the output part 1630 of the light cylinder 1625.

The light cylinder 1625 may be made up of flexible material, as described in FIG. 1 to FIG. 5.

FIG. 17 shows a light device 1700 according to a sixth embodiment of the invention. Referring to FIG. 17, the light device 1700 may be formed by using the light cylinder 1625 without the cover 1610.

In the light device 1700 of the sixth embodiment in FIG. 17, a light source section 1720 and a power supply section 1715 may be combined with faced, and the light cylinder 1725 may be combined with the light source section 1720. The light source section 1720 may be combined with one end, as an entrance part, of the light cylinder 1725, and output parts 1730 may be formed with constant distance on one or more sides of the light cylinder 1725. A light outputted from the light source section 1720 may be emitted through the output parts 1730.

A reflection layer may be also formed on an outer surface of the light cylinder 1725.

The reflection layer may be coated on the clay 110 in the light cylinder 1725, and the output parts 1730 may be formed by forming holes separated with constant distance on the clay 110. Accordingly, the reflection layer does not exist on the output part 1730.

A Fresnel lens may be formed at the end of the output part 1730 like in FIG. 10, under the condition that the entrance part is formed to one end of the light cylinder 1725 and the output part 1730 is formed to the other end of the light cylinder 1725.

In the event that the output part 1730 is formed at one side of both sides of the light cylinder 1725, the Fresnel lens may be formed at the end of the output part 1730 by adhering the Fresnel lens to the end of the output part 1703.

Referring to FIG. 19, in the light device in FIG. 16, a bulb may be combined with the cover 1610. More particularly, the bulb may be combined with an outer surface of the cover 1610 inside which the light source section 1620 is combined.

Consequently, the light device 1900 may prevent the light cylinder 1925 from directly exposed, and may enhance also the diffusion efficiency of the light.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. A light device comprising:
   a cover;
   a light source section combined with at least part of an inside surface of the cover and configured to output a light;
   a light cylinder configured to include one entrance part and a plurality of output parts, the light cylinder including an outer layer and an inside layer including an optical resin formed in the outer layer, and
   a fixing member configured to include a plurality of holes disposed separately from one another with a constant distance therebetween,
   wherein the entrance part is combined with the light source section, and the light incident through the entrance part is outputted through the plurality of output parts,
   wherein a refractive index of the filled optical resin is configured to form a total reflection based on a material used for the outer layer and is higher than a refractive index of the outer layer, and
   wherein each of the plurality of output parts is bent and fixed by passing through a corresponding one of the plurality of holes.

2. The light device of claim 1, wherein a Fresnel lens is formed at an end of at least one of the plurality of output parts, and the Fresnel lens is made up of resin having the same refractive index as the optical resin in the light cylinder.

3. The light device of claim 1, wherein the cover has first and second ends thereof, and a power supply section is combined with each of the first and second ends of the cover.

4. A light device comprising:
   a cover;
   a light source section fixed to one or more inside sides of the cover, and configured to include a light source array;
   light cylinders configured to include an entrance part and an output part, wherein a light incident through the entrance part is outputted through the output part, and
   a fixing member configured to include holes disposed separately from one another with a constant distance therebetween,
   wherein the light cylinders are respectively connected to light sources of the light source array, and
   wherein each of the output parts of the light cylinders is bent and fixed by passing through a corresponding one of the holes.

5. The light device of claim 4, wherein a Fresnel lens is formed at an end of the output part of the light cylinder, and the light source array is an LED array.

6. A light device comprising:
   a bulb;
   a main body, the bulb being combined with one of an upper side and a lower side of the main body;
   a light source section combined with an inside surface of the main body and configured to output a light;
   light cylinders configured to include an entrance part for incidence of a light and an output part for outputting the light, and
   a fixing member fixed to the main body and configured to include holes,
   wherein the entrance parts of the light cylinders are combined with the light source section, and the light incident through the entrance parts is outputted through the output parts, and
   wherein the output parts of the light cylinders are fixed relative to the fixing member by passing through the holes such that a part of each of the light cylinders is bent and passed through a corresponding one of the holes.

7. The light device of claim 6, wherein the light source section includes an LED array, and
   wherein the entrance parts are respectively connected to LEDs in the LED array.

8. The light device of claim 7, wherein lengths of the light cylinders passing through the holes differ depending on a location of the bulb.

9. The light device of claim 6, further comprising:
   a power supply section combined with the other of the upper side and the lower side of the main body opposite the bulb.

10. A light device comprising:
    a bulb;
    a main body, the bulb being combined with one of an upper side and a lower side of the main body;
    a light source section combined with an inside surface of the main body and configured to output a light;
    a light cylinder configured to include one entrance part and a plurality of output parts, the light cylinder including an outer layer and an inside layer including an optical resin formed in the outer layer; and
    a fixing member connected to the inside surface of the main body at one end of the fixing member around the light source section, the fixing member having holes formed therethrough, each of the plurality of output parts is bent and fixed by passing through a corresponding one of the holes,
    wherein the entrance part is connected to the light source section, and the light incident through the entrance part is outputted through the plurality of output parts, and wherein a refractive index of the filled optical resin is configured to form a total reflection based on a material used for the outer layer and is higher than a refractive index of the outer layer.

11. The light device of claim 10, wherein a Fresnel lens is formed at an end of each of the plurality of output parts.

12. The light device of claim 1, wherein the cover has at least a first end and a second end, and the light source section is combined with an inside surface of at least one of the first end and the second end.

* * * * *